United States Patent
Evans et al.

(10) Patent No.: US 12,424,853 B2
(45) Date of Patent: *Sep. 23, 2025

(54) CONFIGURING A SOLAR POWER SYSTEM FOR COMMUNICATIONS

(71) Applicant: Lunar Energy, Inc., Mountain View, CA (US)

(72) Inventors: Kyle Breuning Evans, Auburn, CA (US); Sebastian Wolf, London (GB); Mark Holveck, Sunnyvale, CA (US); Hai-Yue Han, San Jose, CA (US); Craig Patrick Timms, San Francisco, CA (US); Paul Chapman, Orinda, CA (US); Christopher Wright, Haslemere (GB); Ryan Pflaum, Boston, MA (US); Manuel Alejandro Valenzuela Acosta, London (GB); César Pecharromán Arribas, Winchester (GB); James Alexander Stewart Carragher, London (GB); Jesús Prieto Colomina, Haslemere (GB)

(73) Assignee: Lunar Energy, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,571

(22) Filed: May 16, 2024

(65) Prior Publication Data
US 2024/0305105 A1    Sep. 12, 2024

Related U.S. Application Data

(63) Continuation of application No. 18/210,807, filed on Jun. 16, 2023, now Pat. No. 12,149,086.
(Continued)

(51) Int. Cl.
*H02J 3/38* (2006.01)
*G06K 7/14* (2006.01)
(Continued)

(52) U.S. Cl.
CPC .............. *H02J 3/38* (2013.01); *G06K 7/1413* (2013.01); *G06K 7/1417* (2013.01); *H02J 3/32* (2013.01); *H04B 3/548* (2013.01); *H02J 2300/24* (2020.01)

(58) Field of Classification Search
USPC ....................................................... 700/295
See application file for complete search history.

(56) References Cited

U.S. PATENT DOCUMENTS 10,969,414 B2    4/2021    Scrutchfield
11,515,837 B2    11/2022   Mellor, Jr.
(Continued)

FOREIGN PATENT DOCUMENTS

JP    2012038145         2/2012
JP    2012038145 A  *   2/2012   ......... G05B 19/0423

OTHER PUBLICATIONS

Author Unknown, "Generac Installation Manual", retrieved from <https://rexel-cdn.com/products/dman00040.pdf?i=3D584DF8-C509-42AF-942F-085AAEA1D073>, Dec. 3, 2020.
(Continued)

*Primary Examiner* — Emilio J Saavedra
(74) *Attorney, Agent, or Firm* — Van Pelt, Yi & James LLP

(57) ABSTRACT

In various embodiments, a process for configuring or commissioning a solar power system includes receiving, at a controller, hardware identifiers of a plurality of power electronics modules to be configured. Each of the plurality of power electronics modules of at least a portion of the plurality of power electronics modules is associated with a corresponding photovoltaic panel. A hub is configured to wirelessly communicate with the plurality of power electronics modules. The controller is physically connected to the hub and communicates with the hub via wiring that also carries power from photovoltaic panels to an inverter. The process includes configuring, by the controller, the plurality of power electronics modules using the received hardware identifiers.

22 Claims, 14 Drawing Sheets

Related U.S. Application Data

(60) Provisional application No. 63/416,161, filed on Oct. 14, 2022.

(51) Int. Cl.
  *H02J 3/32* (2006.01)
  *H04B 3/54* (2006.01)

(56) References Cited

U.S. PATENT DOCUMENTS

| | | | | |
|---|---|---|---|---|
| 2010/0197307 | A1* | 8/2010 | Horn | H04W 60/02 455/435.1 |
| 2015/0078162 | A1* | 3/2015 | Prakash | H04W 28/0268 370/235 |
| 2016/0336747 | A1* | 11/2016 | Hobbs | H02J 13/00006 |
| 2017/0288599 | A1* | 10/2017 | Chapman | H02J 3/381 |
| 2018/0097360 | A1* | 4/2018 | Batten | H02J 3/38 |
| 2019/0260762 | A1* | 8/2019 | Fynaardt | H04W 12/06 |
| 2021/0257968 | A1* | 8/2021 | Mellor, Jr. | H02J 7/0048 |
| 2022/0027029 | A1* | 1/2022 | Saraogi | H02J 3/381 |
| 2022/0149653 | A1* | 5/2022 | Dustman | H02J 13/00036 |
| 2022/0224782 | A1* | 7/2022 | Wu | H04L 9/3247 |
| 2023/0194645 | A1* | 6/2023 | Chaouki Almagro | H02S 50/00 700/286 |
| 2023/0412603 | A1* | 12/2023 | Anandan | H04L 63/102 |

OTHER PUBLICATIONS

Author unknown, "Getting Started Guide: System Verification Using Installer Toolkit", Enphase Energy, retrieved from <https://www4.enphase.com/en-in/support/getting-started-guide-system-verification-using-installer-toolkit>, 2019.

Author Unknown, "SolarEdge Installation Guide: SolarEdge System Installation Guide", Version 4.2, retrieved from <https://www.solaredge.com/sites/default/files/se-inverter-installation-guide.pdf>, pp. 1-17, 35-43. May 2020.

Author Unknown, Enphase Quick Install Guide, retrieved from <https://www4.enphase.com/sites/default/files/downloads/support/QUICK-INSTALL-GUIDE-IN.pdf>, Jun. 25, 2018.

* cited by examiner

Receive, at a controller, hardware identifiers of a plurality of power electronics modules to be commissioned, wherein: each of the plurality of power electronics modules of at least a portion of the plurality of power electronics modules is associated with a corresponding photovoltaic panel; a hub is configured to wirelessly communicate with the plurality of power electronics modules; and the controller is physically connected to the hub and communicates with the hub via wiring that also carries power from photovoltaic panels to an inverter
200

Commission, by the controller, the plurality of power electronics modules using the received hardware identifiers
202

FIG. 2

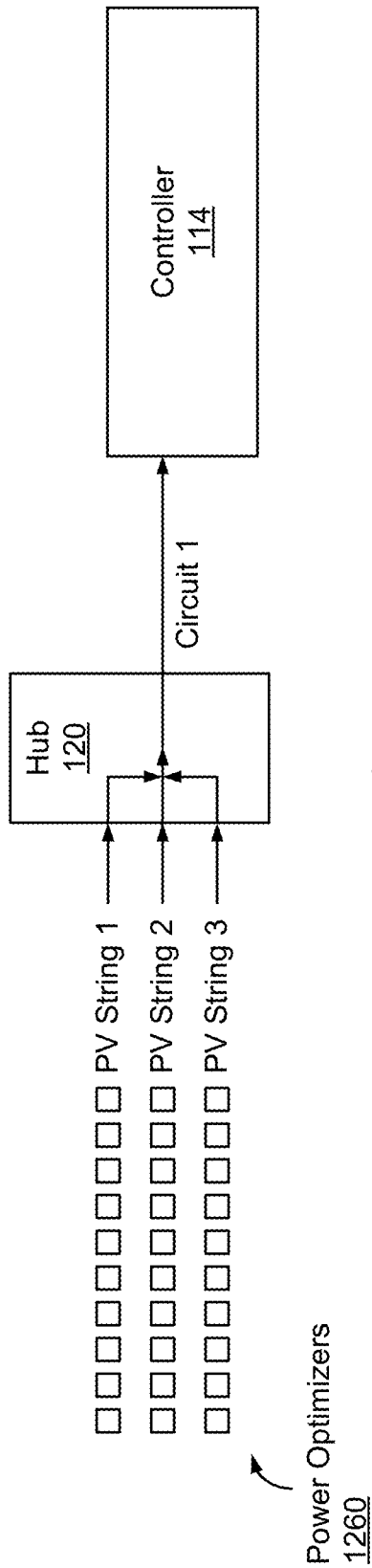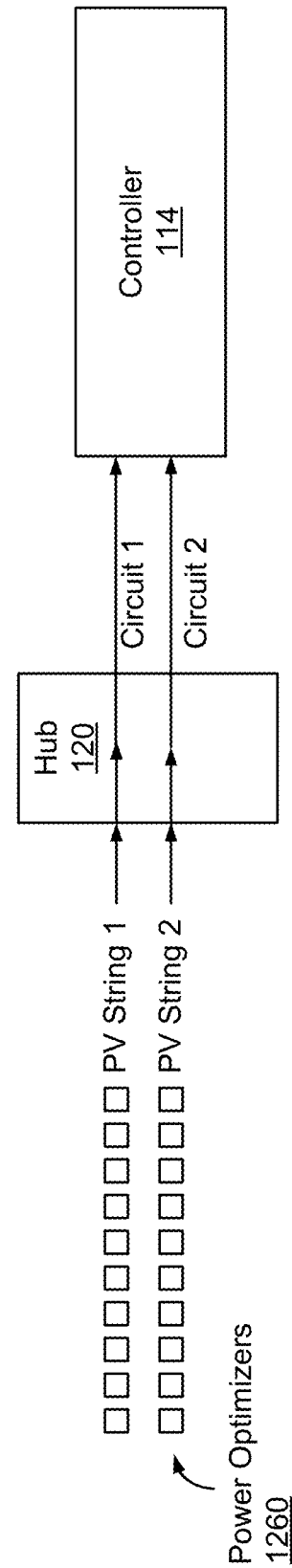

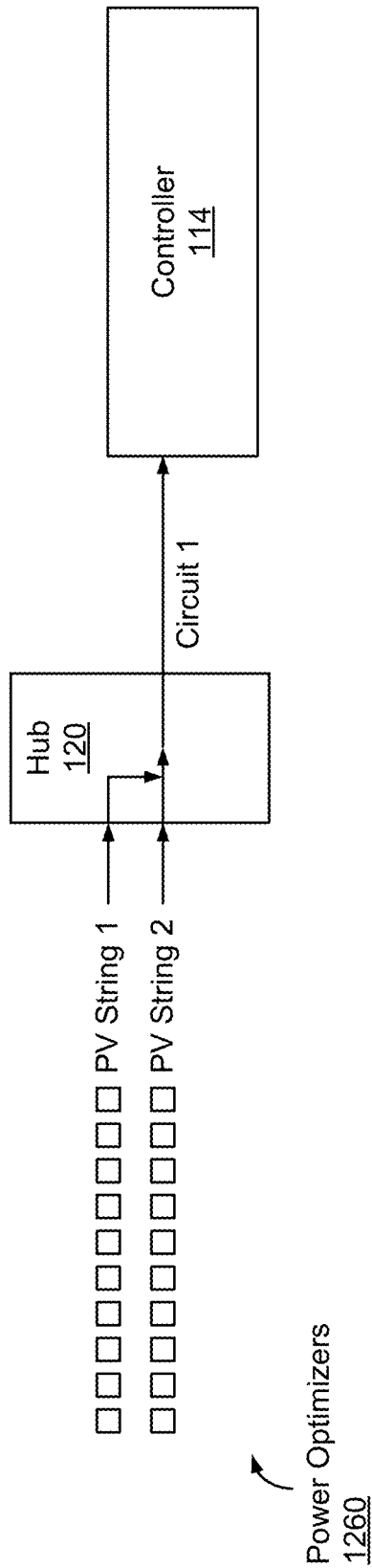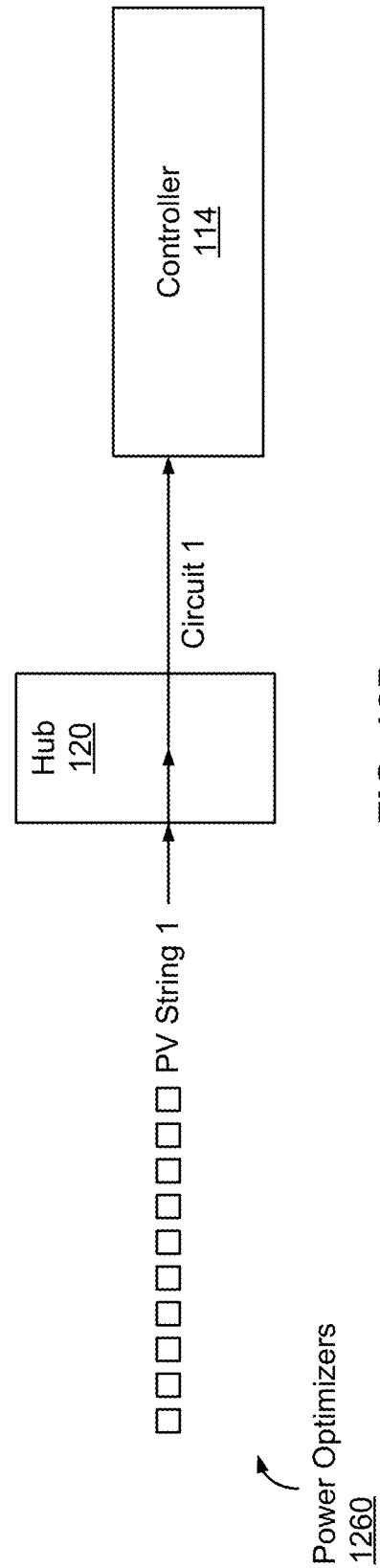

CONFIGURING A SOLAR POWER SYSTEM FOR COMMUNICATIONS

CROSS REFERENCE TO OTHER APPLICATIONS

This application is a continuation of U.S. patent application Ser. No. 18/210,807 entitled CONFIGURING A SOLAR POWER SYSTEM FOR COMMUNICATIONS filed Jun. 16, 2023, now U.S. Pat. No. 12,149,086, which is incorporated herein by reference for all purposes, which claims priority to U.S. Provisional Patent Application No. 63/416,161 entitled COMMISSIONING A SOLAR POWER SYSTEM filed Oct. 14, 2022 which is incorporated herein by reference for all purposes.

BACKGROUND OF THE INVENTION

A solar power system, or more generally, an energy storage and provisioning system, typically needs to be commissioned in order to function as intended. For example, when system components are taken out of the box, installed, and plugged in, they might not have up-to-date firmware and/or established communication channels, among other things, and therefore configuring the system components for communication (e.g., commissioning) can enhance system functionality. The architecture of a solar power system may include multiple devices, in different locations on the site, that need to coordinate, which affects the difficulty of configuring system components to communicate.

BRIEF DESCRIPTION OF THE DRA WINGS

Various embodiments of the invention are disclosed in the following detailed description and the accompanying drawings.

FIG. 2 is a flow diagram illustrating an embodiment of a process for commissioning a solar power system.

FIG. 12A is a block diagram illustrating an embodiment of a system for commissioning a solar power system including a hub and a circuit.

FIG. 12B is a block diagram illustrating an embodiment of a system for commissioning a solar power system including a hub and a plurality of circuits.

FIG. 12C is a block diagram illustrating an embodiment of a system for commissioning a solar power system including a hub and a circuit.

FIG. 12D is a block diagram illustrating an embodiment of a system for commissioning a solar power system including a hub and a circuit.

DETAILED DESCRIPTION

Figure 1:
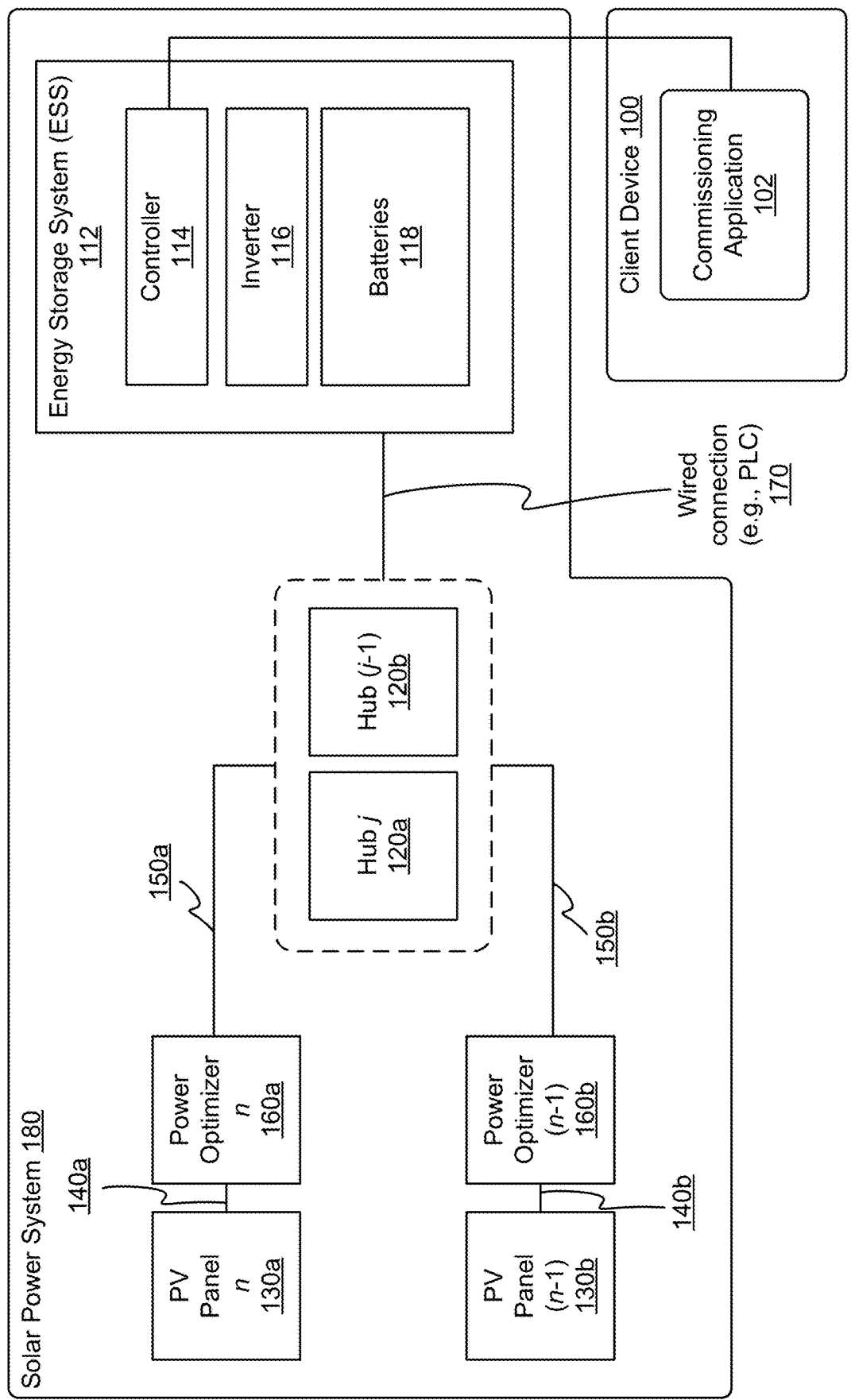
FIG. 1 is a block diagram illustrating an embodiment of a system for commissioning a solar power system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for configuring a solar power system for communications are disclosed. In various embodiments, a solar power system in which power electronics modules (e.g., on a roof) communicate wirelessly with a "hub" and the "hub" communicates over a wired connection with a controller is commissioned using the disclosed techniques. As will be described in more detail below, the disclosed techniques (and corresponding architecture) avoid some disadvantages associated with other commissioning techniques, such as high system/hardware and labor costs from a fully wired communication network, poor and intermittent wireless connectivity between devices on the roof or between the roof and the ground in a fully wireless communication network, or a cumbersome user experience for an installer. Although the examples are described with respect to commissioning a system, this is merely exemplary and not intended to be limiting. For example, the disclosed techniques may be applied after commissioning since the established communication paths may be continuously used, and/or to re-establish, trouble-shoot, or otherwise configure system components to communicate.

In various embodiments, a process for commissioning a solar power system includes receiving, at a controller, hardware identifiers of a plurality of power electronics modules to be commissioned. As further described with respect to FIG. 1, each of the plurality of power electronics modules of at least a portion of the plurality of power electronics modules is associated with a corresponding photovoltaic (PV) panel. In other words, within a subset of power electronics modules, each of the power electronics modules has a corresponding PV panel. A hub is configured to wirelessly communicate with the plurality of power electronics modules. The plurality of power electronics modules may be installed in various places such as on the roof, at ground level, on other structures, or the like. The controller is physically connected to the hub and communicates with the hub via wiring (e.g., power line communications or PLC) that also carries DC power from PV panels to an inverter. The process includes commissioning, by the controller, the plurality of power electronics modules using the received hardware identifiers.

FIG. 1 is a block diagram illustrating an embodiment of a system for commissioning a solar power system. The system includes a solar power system 180 and a client device 100 for commissioning the solar power system. The disclosed techniques may be applied to commission the example system 180 (or more generally, any electrical power system). To preserve the readability of the diagram, some connections and/or components are not necessarily shown.

The solar power system 180 includes one or more PV panels (130a and 130b), one or more power optimizers (160a and 160b), one or more hubs (120a and 120b), and an energy storage system (ESS) 112. In various embodiments, the PV panel(s), power optimizer(s), and/or hub(s) are co-located (e.g., on the roof), while the ESS is remote (e.g., in the garage).

The power optimizers (sometimes called "maximizers") are module-level power electronics that are used to control and/or manage PV panels. In various systems in which the disclosed commissioning process can be applied, the power optimizers may be included in or replaced by module-level power electronics. For simplicity, "power optimizers," "module-level power electronics," and "power electronics modules" are used interchangeably. A power optimizer adjusts the configurations of the PV panel (e.g., the voltage the PV panel is at) to optimize the power generated by the PV panel. In various embodiments, there is an array of PV panels and each PV panel has its own associated power optimizer so that each PV panel can be configured and/or optimized independently of other PV panels.

In this example, there are n power optimizers connected together in series, including the $n^{th}$ power optimizer (160a) and the $(n-1)^{th}$ power optimizer (160b). The $n^{th}$ and $(n-1)^{th}$ power optimizers (160a and 160b) are respectively connected to and correspondingly manage the $n^{th}$ and $(n-1)^{th}$ PV panels (130a and 130b). The energy generated by a given PV panel (e.g., 130a) is passed along to the rest of the system by a corresponding power optimizer (e.g., 160a). In this example, the outputs of the power optimizers (160a and 160b) are in the DC domain. The power optimizers (160a and 160b) transfer energy from the PV panels (130a and 130b) into a DC bus.

In this example, the ESS 112 includes a controller 114, inverter 116, and one or more battery modules 118. That is, the inverter, the controller, and the battery module(s) are co-located. The controller 114 (sometimes called a "home controller") can be a separate component from the inverter as shown or can be included in the inverter 116 to provide control of the inverter and/or other system components. In various embodiments, the controller is configured to communicate with a commissioning application 102 to perform the disclosed commissioning process to enable the solar power system 180 to function. Each battery module includes a battery storage (or any other type of energy storage as appropriate) and a DC-DC converter. In various embodiments, the inverter 116 manages the flow of electricity back and forth between a DC side (e.g., in the form of the DC bus to which DC devices are attached such as the power optimizers, the DC interface of the inverter, etc.) and an AC side (e.g., in the form of an AC bus to which AC devices are attached such as a breaker panel to the grid, the AC interface of the inverter, etc.).

Figure 13A:
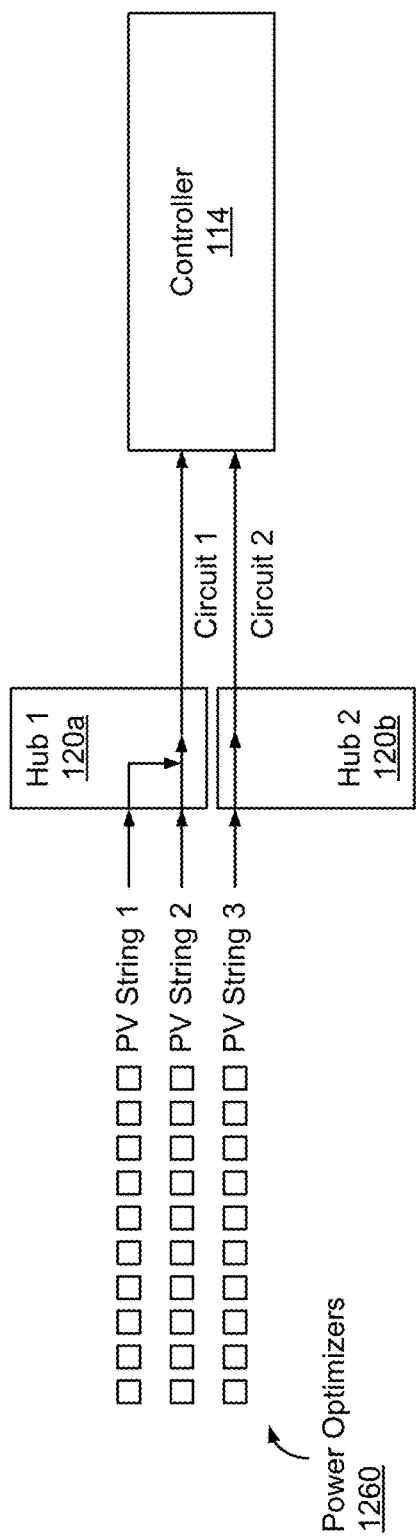
FIG. 13A is a block diagram illustrating an embodiment of a system for commissioning a solar power system including a plurality of hubs.
Figure 13B:
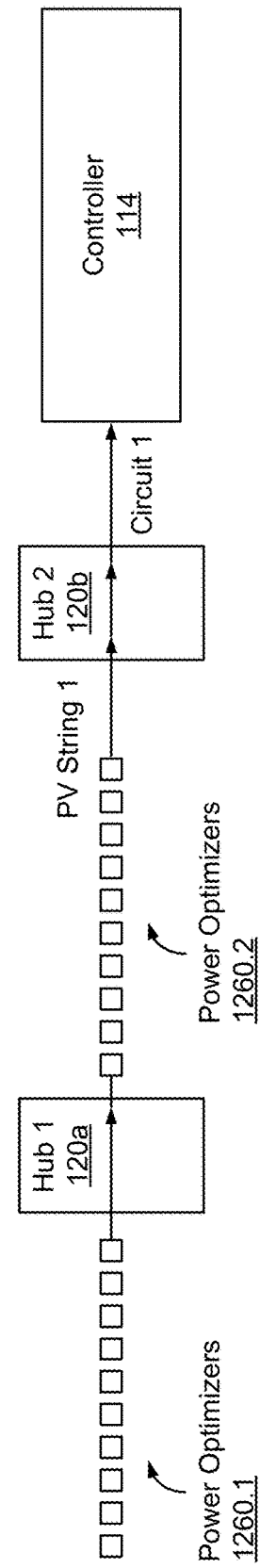
FIG. 13B is a block diagram illustrating an embodiment of a system for commissioning a solar power system including a plurality of hubs.

One or more hubs (120a and 120b; collectively referred to as 120) are configured to facilitate communications within the solar power system. Typically, a system includes a single hub. However, this is not intended to be limiting as additional hubs can be added to expand the communications range of the hub. For example, when a subarray of optimizers is isolated and cannot communicate with the rest of the array, an additional hub can be added to provide connectivity to the subarray. An example of a hub is PV Hub by Lunar Energy, Inc. Some example configurations with multiple hubs are shown in FIGS. 13A and 13B.

In various embodiments, the hub wirelessly communicates with the plurality of power electronics modules via a mesh network. The hub communicates with the controller over power line communications (PLC). The hub translates the plurality of wireless mesh signals from each of the power optimizers into a wired signal for communications between the hub and the inverter. The hub can include or be included in a power combiner box or a junction box. Conventional systems typically do not include a hub. Instead, in some conventional systems, the power optimizers use wired communications such as PLC. The power optimizers send signals over a DC circuit and each individual device communicates with the inverter, which is the main controller of the system. This can be expensive because PLC communication chips are expensive. A conventional system may have 10-60 PV panels, which correspond to 10 to 60 power optimizers. In some conventional systems, power optimizers communicate wirelessly with a controller, and no wired connections are used. However, signal strength may be limited by factors such as blocking/interfering components (e.g., roofing material, attic installation, a wall of the house, other items on the roof such as satellite dishes, etc.). In some conventional systems, microinverters (instead of a central inverter) are used. The microinverter is a module-level power electronic device, so there is one device per module on the roof that communicates via PLC with a main controller.

By contrast, the disclosed system uses hybrid communications that include a wired connection 170 from a controller to a hub, a wireless connection (150a and 150b) from the hub to the power optimizers, and a wired connection (140a and 140b) from the power optimizers to the PV panels. In various embodiments, the disclosed system has a single PLC transmitter and receiver in a PV hub. The system may have a small number (e.g., one or a few) of hubs. The electronics in the hub are protected by providing them in a substantially sealed box that is weather resistant. One of the advantages of the disclosed system is a good balance between cost and performance. For example, good communications can be implemented in a cost-effective way. The disclosed commissioning process takes into account this unique architecture in which the power optimizers and hub communicate wirelessly, and the hub and controller communicate over a wired connection.

The client device 100 includes a commissioning application 102 for commissioning the solar power system 180. As further described with respect to FIG. 11, the client device is a programmed computer system such as a smartphone that can be configured to perform the disclosed commissioning process. In various embodiments, a user operates the client device 100 by running the commissioning application 102 to commission the solar power system. The user is also sometimes referred to herein as an installer since the typical user is the one who installs the solar power system 180. For example, the user downloads the commissioning application and runs the application to enable the commissioning application to cooperate with the controller 114 to perform a commissioning process.

As further described with respect to FIG. 2, commissioning provides operating parameters to the controller 114. Example parameters include the media access control (MAC) addresses of devices (e.g., power optimizers 160a and 160b and inverter 116) in the system and the latest firmware version. The MAC addresses can be used to create a whitelist of devices. Given the whitelist, the controller attempts to communicate with the devices including by verifying that all devices in the whitelist are present and reachable, and instructing the devices to obtain the latest (or approved) firmware update if the devices do not already have the latest (or approved) version. Devices that are not part of the whitelist are not permitted to communicate with the controller. One benefit is enhanced security because devices that are not authorized to communicate with the system cannot do so, as further described herein. Tests may include communication tests or safety functionality installation tests. The controller instructs the devices to perform the tests and when the devices confirm completion, then they are commissioned.

FIG. 2 is a flow diagram illustrating an embodiment of a process for commissioning a solar power system. This process may be implemented by or on the system described with respect to FIG. 1, and will be explained with reference to FIG. 1. For example, the process may be performed by the controller 114 in cooperation with the commissioning application 102 to commission the solar power system 180.

Returning to FIG. 2, in the example shown, the process begins by receiving, at a controller, hardware identifiers of a plurality of power electronics modules to be commissioned (200). The hardware identifiers can be a variety of identifiers that uniquely identify a device (here, a power electronics module). An example of a hardware identifier is a MAC address, which uniquely identifies a hardware device by a network address. Referring to FIG. 1, an example of a power electronics module is a power optimizer such as 160a and 160b. An example of a controller is controller 114.

Each of the plurality of power electronics modules of at least a portion of the plurality of power electronics modules is associated with a corresponding photovoltaic panel. In other words, within (at least) a subset of power electronics modules, each of the power electronics modules has a corresponding PV panel. A hub is configured to wirelessly communicate with the plurality of power electronics modules. The controller is physically connected to the hub and communicates with the hub via wiring that also carries power from photovoltaic panels to an inverter. Referring to FIG. 1, each power optimizer (160a and 160b) has a corresponding PV panel (130a and 130b). An example of a hub is hub (120a and 120b). The hub and the power optimizers are on a same wireless network such as a mesh network. The hub communicates with the controller 114 via a wired connection such as PLC.

Returning to FIG. 2, the process commissions, by the controller, the plurality of power electronics modules using the received hardware identifiers (202). Commissioning refers to a process by which system components are configured to function as intended. For example, an installer can initiate the commissioning process via a software application such as a smartphone application 102 of FIG. 1. In various embodiments, commissioning includes establishing a communications channel, exchanging configuration information, performing updates such as firmware updates, and performing tests, as further described with respect to FIG. 4. In various embodiments, a whitelist of devices is first created and then, for each device in the whitelist, a communications channel is established, configuration information is exchanged, updates are performed, and tests are performed, as further described with respect to FIG. 3.

In various embodiments, commissioning is performed once at the beginning of system installation and does not need to be repeated unless devices are changed, removed, or added or re-commissioning is otherwise desired. For example, after successfully commissioning, the system is not reliant on wireless connectivity to operate. Safety functions such as Rapid Shutdown do not require wireless connectivity.

Unlike conventional processes where hardware identifiers are obtained by individually collecting identifiers such as clicking and scanning each device separately, the disclosed process allows an installer to scan codes at the same time and/or place in various embodiments. A code (e.g., a barcode or matrix code such as a QR code) can be scanned to obtain the hardware identifier for the associated device. For example, an installer uses their phone camera to seamlessly scan QR codes by passing the phone over a sheet of paper with QR codes, as further described herein.

Figure 3:
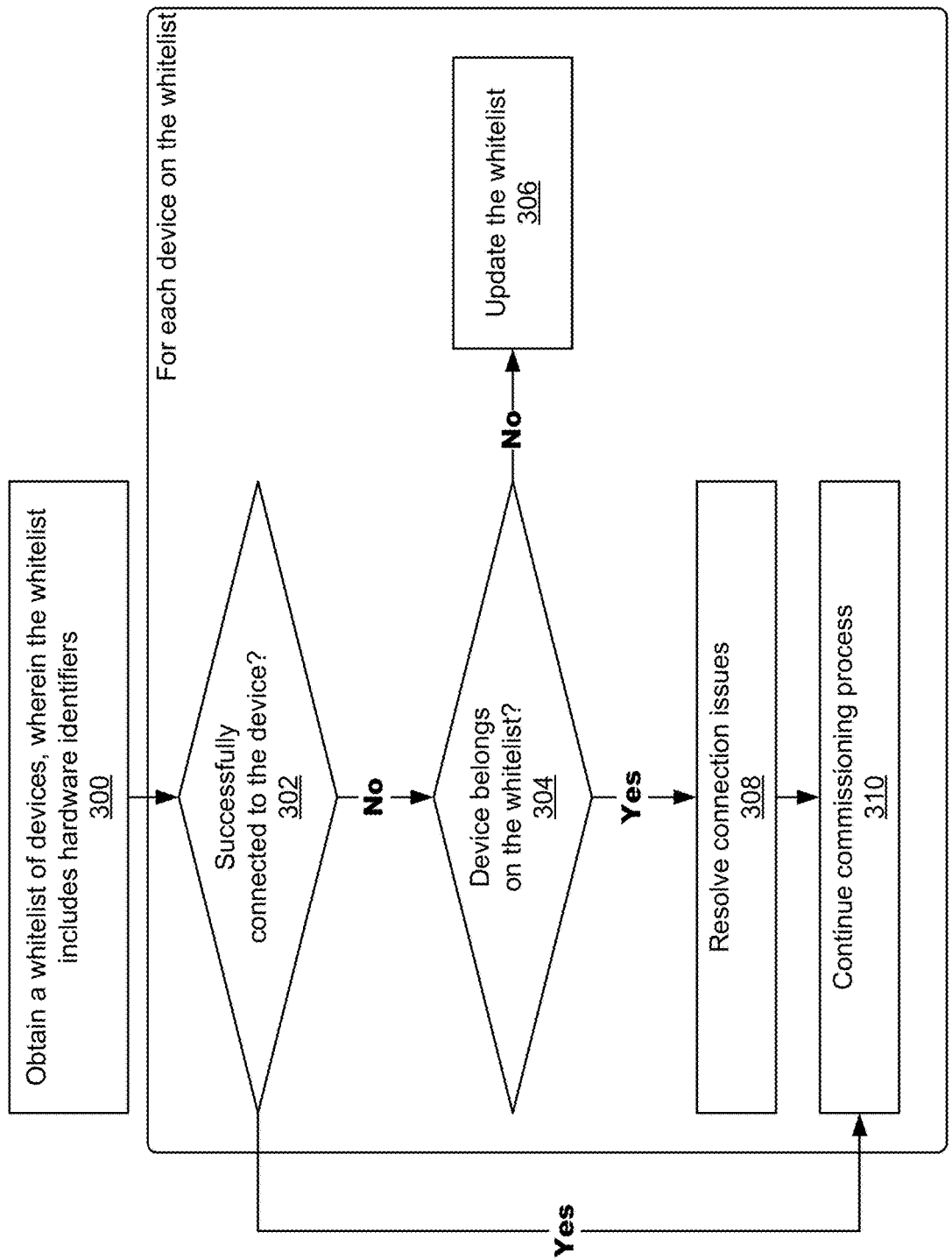
FIG. 3 is a flow diagram illustrating an embodiment of a process for commissioning a solar power system including by using a whitelist of devices.

FIG. 3 is a flow diagram illustrating an embodiment of a process for commissioning a solar power system including by using a whitelist of devices. The process may be performed by or on the system of FIG. 1, for example, by a controller (e.g., 114) and a commissioning application (e.g., 102) to commission a solar power system (e.g., 180). The process may be performed as part of another process such as 202 of FIG. 2.

The process begins by obtaining a whitelist of power electronics modules (or, more generally, devices), where the whitelist includes hardware identifiers (300). The hardware identifiers may be those received at 200. In other words, the devices on the whitelist are identified by their hardware identifiers. An advantage of using the whitelist is improved security because a controller will attempt to connect with only those devices on the whitelist and not others. By contrast, conventional systems typically attempt to contact any device within range or only with devices over a wired connection such as PLC. Additionally, attempting to connect with only those devices on the whitelist is more computationally efficient since a compartmentalized or finite list of target devices typically means the commissioning process will be completed more quickly.

In various embodiments, the hardware identifiers are received based at least in part on scanning of barcodes corresponding to the plurality of power electronics modules. An example of a barcode is a matrix code such as a QR code. The hardware identifiers uniquely identify a hardware device. For example, the identifier includes a MAC address of a power electronics module. A QR code may be removably affixed to devices prior to installation, e.g., as a sticker. As part of the installation process, an installer removes the QR code sticker and places it on a sheet of paper. All QR code stickers are placed on the same sheet of paper to make scanning the QR codes of all of the devices more convenient. The installer uses the commissioning application 102 to input the QR codes, for example, by using a smartphone camera to scan in the QR codes as further described with respect to FIG. 5.

Returning to FIG. 3, the process determines whether a successful connection to the device is made (302). For example, the controller and the device perform a handshake where the controller sends a message and the device responds with an acknowledgement. During the handshake, the controller and device may exchange identifying information. If the device's identifying information matches the expected information such as the whitelist information, then the controller authenticates the device and a successful connection is made.

If the process determines that a device on the whitelist failed to connect, the process proceeds to determine whether the device belongs on the whitelist (304). For example, an installer scanned 50 devices, but the controller is only able to connect with 49 devices. One possibility is that the device corresponding to one of the QR codes actually was not installed. Perhaps the QR code was inadvertently scanned due to being a leftover sticker from a different installation. Another reason why the QR code was inadvertently scanned could be that the installer had planned to install the device, and then decided not to because they could not fit the device in the available space or configuration. If the device does not belong on the whitelist, the process updates the whitelist to remove the device (306). An installer can review the whitelist and determine that the device does not belong on the whitelist, so the whitelist should be updated to remove the device. The device can be removed via a user interface such as the one shown in FIG. 9.

Otherwise, if the device does belong on the whitelist, the process proceeds to resolve connection issues (308). The connection issues can be resolved in a variety of ways. For example, the device may have a manufacturing defect or was not installed correctly. Possible causes of connection issues include not having power because the device is not plugged in, a component such as an antenna on the device is broken, or a circuit board component shorted, being too far away from the hub, etc. Troubleshooting information can be determined and output. For example, information for resolving a connection issue with the device can be displayed on a user interface of the commissioning application 102 as further describe herein. The information can be displayed in an interactive manner, e.g., as a dynamically updated checklist or series of questions where an installer answers a first question and information is output based on the installer's answer to narrow down the possible causes and solutions of the connection issues.

Figure 4:
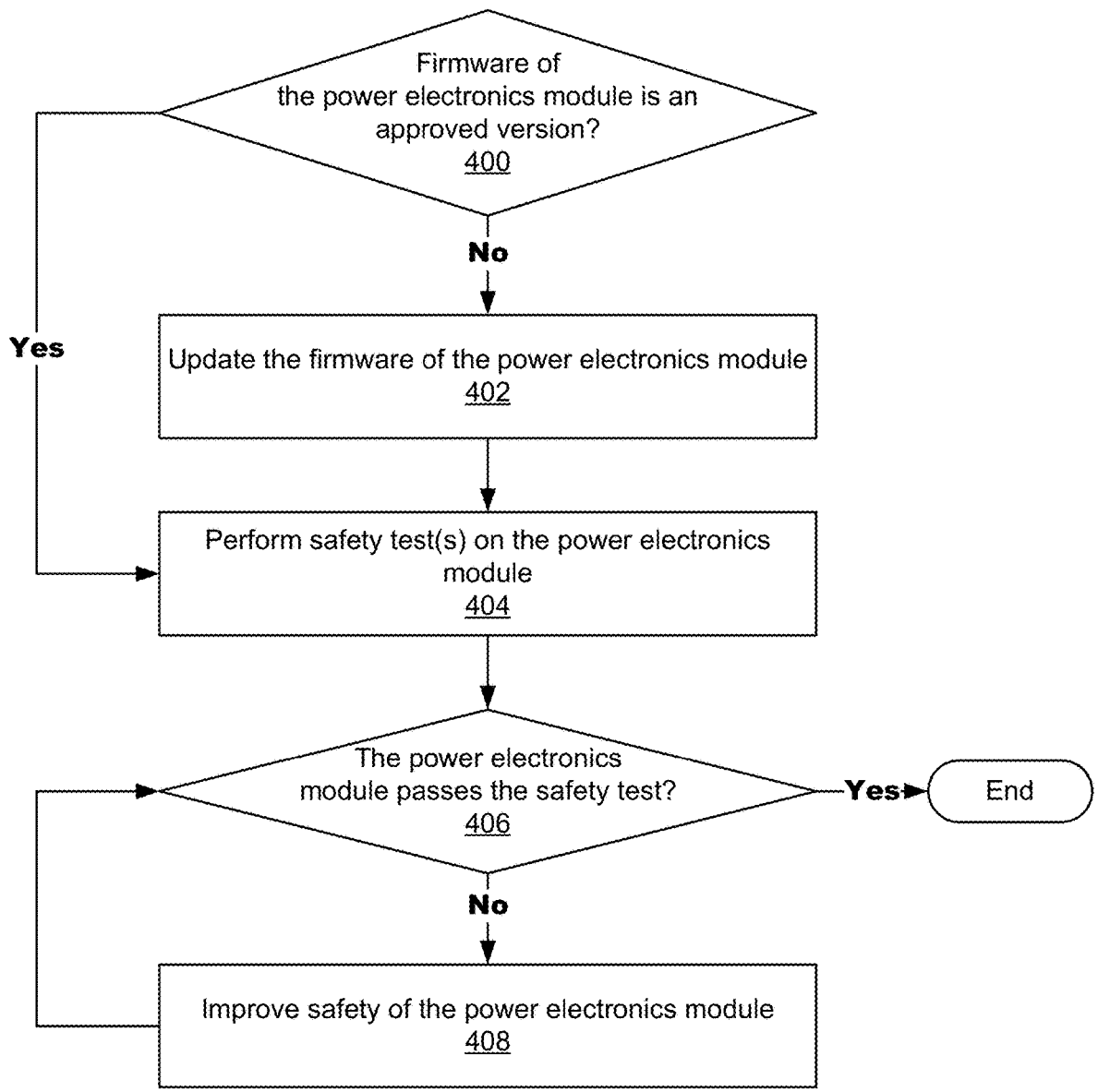
FIG. 4 is a flow diagram illustrating an embodiment of a process for commissioning a solar power system.

Upon successful resolution of the connection issues, the process continues the commissioning process (310), an example of which is shown in FIG. 4.

FIG. 4 is a flow diagram illustrating an embodiment of a process for commissioning a solar power system. The process may be performed by or on the system of FIG. 1, for example by a controller (e.g., 114) and a commissioning application (e.g., 102) to commission a solar power system (e.g., 180). The process may be performed as part of another process such as 202 of FIG. 2 or 310 of FIG. 3.

The process determines whether firmware of a power electronics module is an approved version (400). The firmware version of the power electronics module can be determined by querying the power electronics module. If the reported version matches an approved version (e.g., via a lookup table), then the firmware is adequate. In various embodiments, the firmware includes information that devices may need to operate. For example, for power optimizers, the firmware includes operating modes and settings. For inverters, the firmware includes site-specific settings such as desired behavior for one site and not for another site. User-specified settings may also be included in the firmware. In various embodiments, the firmware includes instructions for performing safety tests. The firmware can also carry out procedures such as rapid shutdown.

In various embodiments, firmware updates are performed at least in part offline. One benefit of doing so is that the commissioning or configuration process is not hampered by poor Internet connectivity. For example, a commissioning application (e.g., 102 of FIG. 1) can download an appropriate (e.g., current) firmware version when an Internet connection is available. Later, the commissioning application can transmit the appropriate firmware version to the controller even if the controller (e.g., 114) is experiencing poor or no Internet connectivity. For example, a smartphone on which the commissioning application is installed (e.g., the client device 100) and/or the controller may not be connected to the Internet The process determines whether the power electronics module passes the safety test (406). If the firmware version is not approved, then the process proceeds to update the firmware of the power electronics module (402). The approved version can be pushed (by the controller) to the devices via the established connection.

Otherwise, if the firmware version is approved, the process proceeds to perform safety tests on the power electronics module (404). Safety tests may include sensing shorts or faults in the devices. For example, the safety tests can verify that the installer correctly wired components by detecting resistance between a specific line and ground, that all grounded components are bonded together, etc.

If the power electronics module passes the safety test(s), the process ends. Otherwise, the process proceeds to improve the safety of the power electronics module (408) until the module passes the safety test(s). For example, an installer may re-wire components if they were initially wired incorrectly (causing the failure of the test) to improve the safety.

In various embodiments, one or both of (i) the firmware update (400 and 402) and (ii) the safety test (404-408) can be performed, and can be performed in any order.

In various embodiments, a controller (e.g., 114) associated with the solar power system emits a Wi-Fi signal/ network. A client device 100 joins the Wi-Fi network. Upon joining a Wi-Fi network provided by a controller/ESS, a series of screens are displayed to the installer's device corresponding to the commissioning process. The screens may be displayed within a commissioning application 102. An installer can supervise the commissioning process by providing information requested by the controller and/or troubleshooting using the commissioning application. The following figures show some examples of graphical user interfaces.

In various embodiments, the controller automatically selects an appropriate grid code. As used herein, a grid code refers to a list of operating requirements. This is beneficial because an installer need not understand the nuances of how a system should be exactly operating. Instead, the installer provides basic input such as what utility the system is being installed in and/or geographical location. The system can automatically provide the appropriate grid code.

Figure 5:
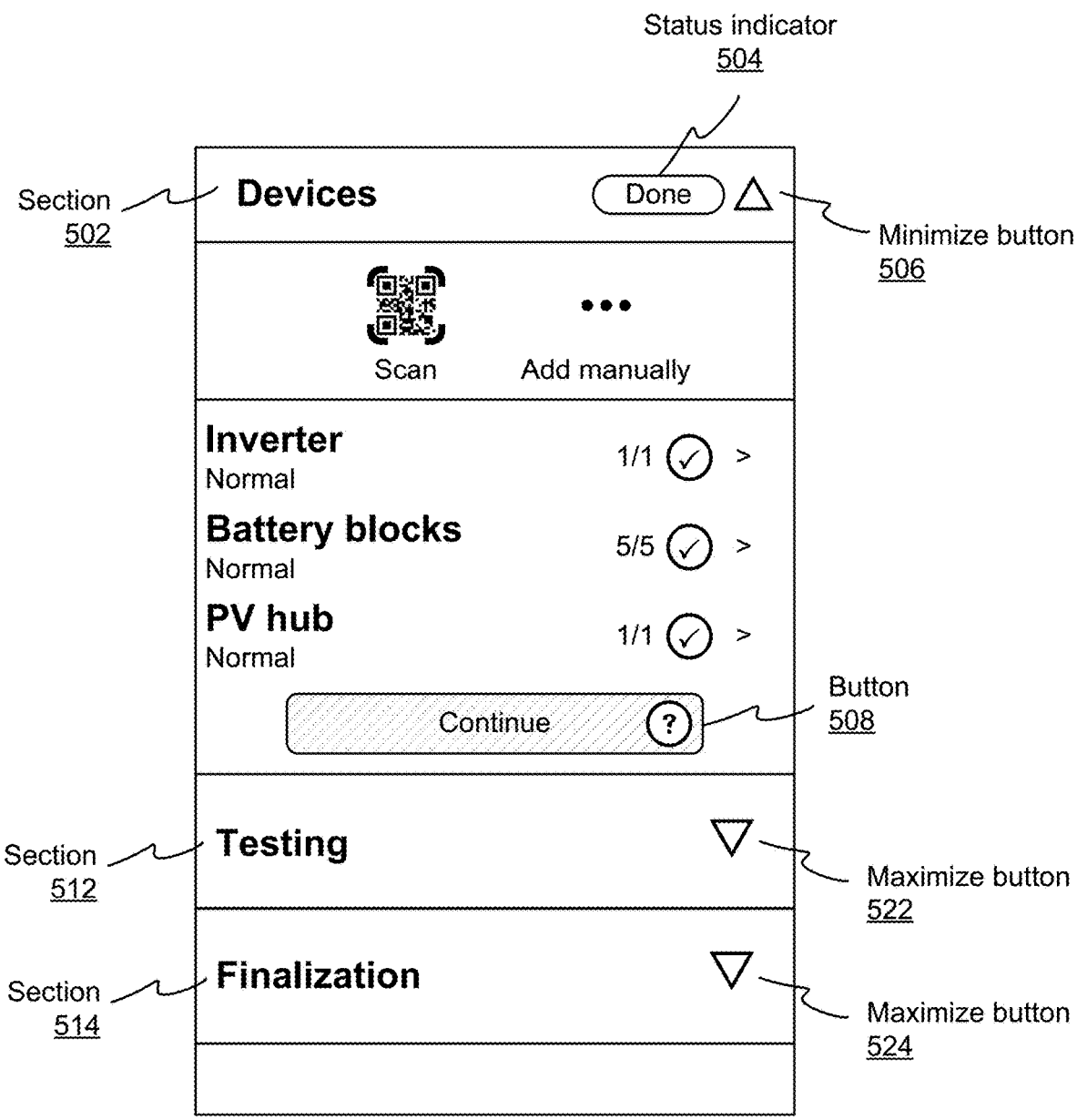
FIG. 5 shows an example of a graphical user interface for providing instructions to input a QR code for a commissioning process according to an embodiment.

FIG. 5 shows an example of a graphical user interface for providing instructions to input a QR code for a commissioning process according to an embodiment. In various embodiments, this screen is displayed before the installer's device successfully joins a Wi-Fi network emitted by the controller/ESS. As shown here, a whitelist of devices can be described before the rest of the system (including the controller) is in place.

The user interface includes sections 502, 512, and 514, which show the three phases/parts in this example commissioning process. The number and order of phases is merely exemplary and not intended to be limiting. A status indicator 504 next to a corresponding section indicates whether that phase is done/completed. In various embodiments, selecting minimize button 506 causes the devices section 502 to be minimized or hidden. Similarly, selecting the maximize button 522 or 524 causes the corresponding section (Testing section 512 for button 522 and Finalization section 514 for button 524) to be maximized or details to be displayed. In various embodiments, maximize/minimize button 506 is not provided and the user is guided through a set of one or more configuration phases in another manner. For example, the GUI presents a subsequent phase after condition(s) in a prior phase are met, as further described with respect to FIG. 10. An example of the Testing section 512 is further described with respect to FIG. 10.

The devices section provides an option for live capture (scanning of a QR code) or text entry ("Add manually"). Displayed below the entry options is a whitelist of devices. In this example, the whitelist includes one inverter, five battery blocks, and one PV hub. The number and type of devices would vary depending on the installed system. In various embodiments, any device that uses PLC can be included (e.g., inverters, PV optimizers, load controllers/ hubs, etc.). Here, each of the devices have already been entered and match the expected number of devices as indicated by the checkmark circular icon. The details of each device can be viewed by selecting the arrow to the right of the corresponding device type, an example of which is further described with respect to FIG. 9. The user interface can reflect that an ID entered is for a specific type of device (e.g., inverter). For example, upon scanning a QR code, the user interface will update the display to show which category/type of device the device belongs to.

Selecting a help icon (e.g., button 508) causes relevant information to be displayed. The installer can select the continue button to proceed to the next step in the commissioning process.

Figure 6B:
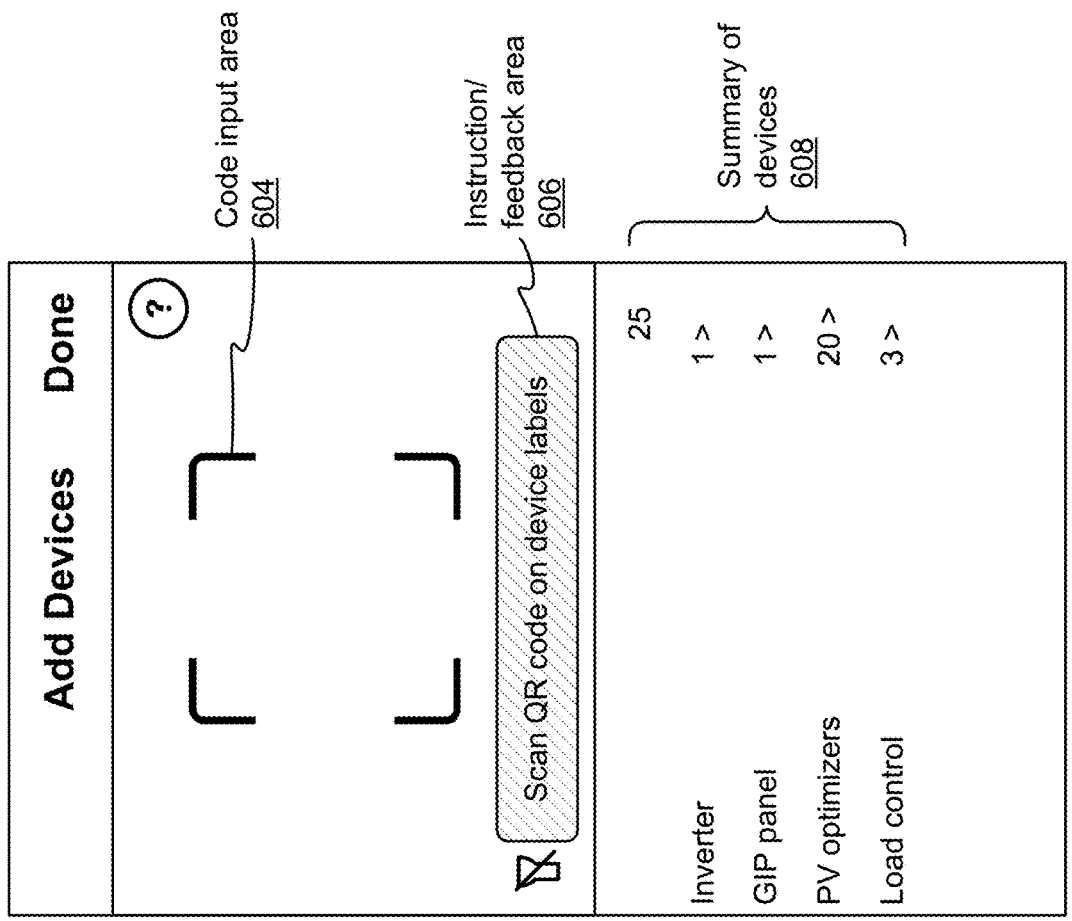
FIG. 6B shows an example of a graphical user interface for receiving a QR code input for a commissioning process according to an embodiment.
Figure 6A:
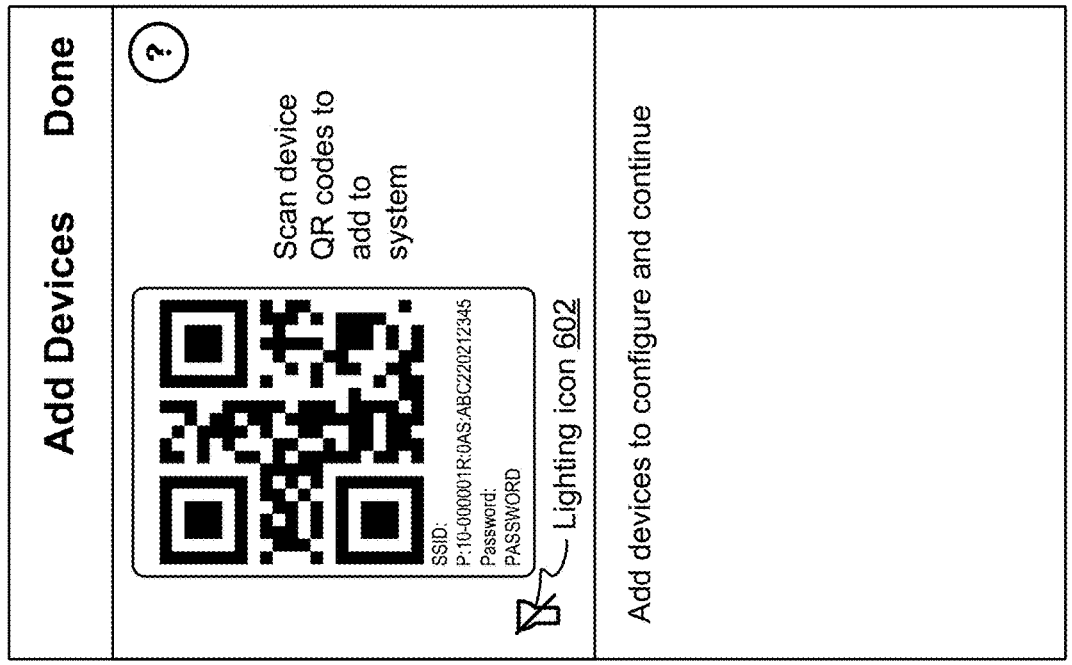
FIG. 6A shows an example of a graphical user interface for providing instructions to input a QR code for a commissioning process according to an embodiment.

FIG. 6A shows an example of a graphical user interface for providing instructions to input a QR code for a commissioning process according to an embodiment. For example, this user interface may be displayed as an initial screen in the commissioning process or may be displayed after selecting "scan" in FIG. 5. This user interface shows an example of a QR code to indicate the type of code expected to be scanned. Lighting icon 602 indicates whether a smartphone flashlight is on or off and can be selected to turn the flashlight on or off. Sometimes, if there is difficulty reading a QR code, turning on the flashlight can help successfully scan the QR code. The bottom section of the user interface may include instructions, here inviting the user to add devices to configure and continue. The question mark icon can be selected to display relevant information or help for the current screen. Although not shown, in various embodiments, a menu permits an installer to select between the QR code and text entry.

FIG. 6B shows an example of a graphical user interface for receiving a QR code input for a commissioning process according to an embodiment. Each of the components are like their counterparts in FIG. 6A unless otherwise described. For example, this screen can be displayed in response to the smartphone camera detecting an image. Code input area 604 indicates the region where the QR code should be entered, for example, by aligning a rear-facing camera of the smartphone with the QR code. The instruction/feedback area 606 includes instructions. Feedback can be dynamically provided, for example, displaying messages about difficulty detecting the QR code, processing status, or indicating that a QR code has already been scanned or a device has already been added. Feedback can also be provided by changing the color of the brackets in the code input area 604. For example, green may indicate that the QR code can be read, blue indicates processing, and red indicates an error in reading the QR code. The user interface also includes a summary of devices section 608, which shows the whitelist. In various embodiments, the whitelist is updated as each code is scanned. This section corresponds to the section described in FIG. 5. Here, the number of each type of device (inverter, GIP panel, PV optimizers, and load control) is displayed and the total number of devices is displayed above the whitelist. If another PV optimizer is successfully scanned, then the PV optimizers would update to read "21," as described with respect to FIG. 7C.

Figure 7A:
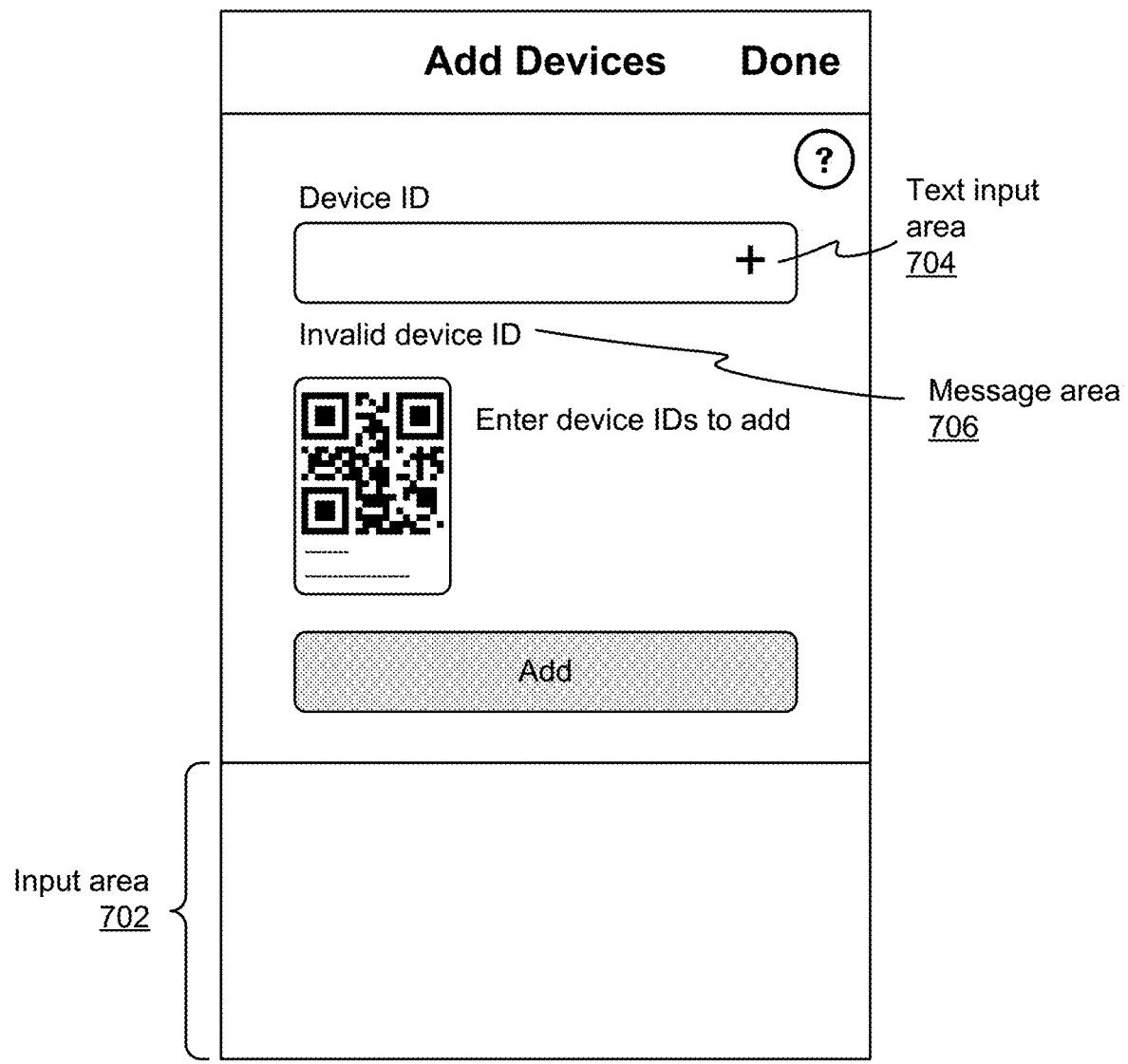
FIG. 7A shows an example of a graphical user interface for receiving text input for a commissioning process according to an embodiment.

FIG. 7A shows an example of a graphical user interface for receiving text input for a commissioning process according to an embodiment. Text input is an alternative to inputting a QR code. For example, this user interface may be displayed after selecting "Add manually" in FIG. 5. Input area 702 may include a keyboard (not shown) or other input such as accepting handwriting and recognizing text corresponding to the handwriting. The input is also populated in text input area 704. For example, if an installer wishes to manually input the MAC address of a device, they can use a keyboard in the input area 702 to type in the device ID. Additional IDs can be entered using the "+" sign. Message area 706 displays feedback, here the example is that an invalid device ID has been entered. To change the input format to QR code scanning instead, the user can select the QR code below the Device ID.

Figure 7C:
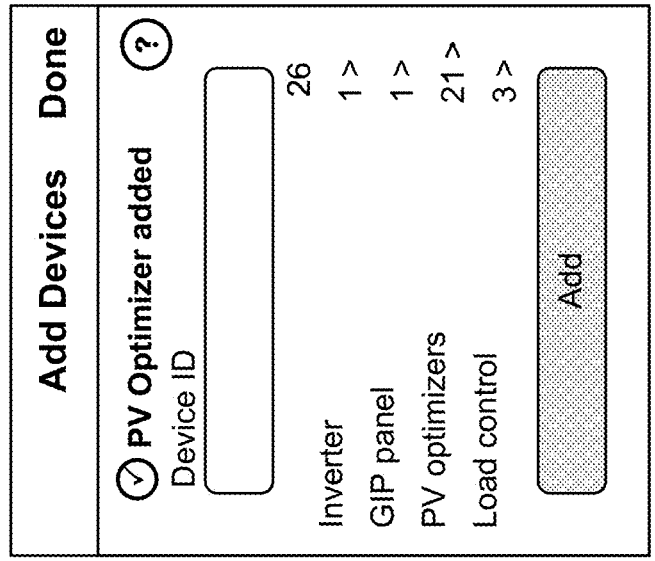
FIG. 7C shows another example of a graphical user interface for receiving text input for a commissioning process according to an embodiment.
Figure 7B:
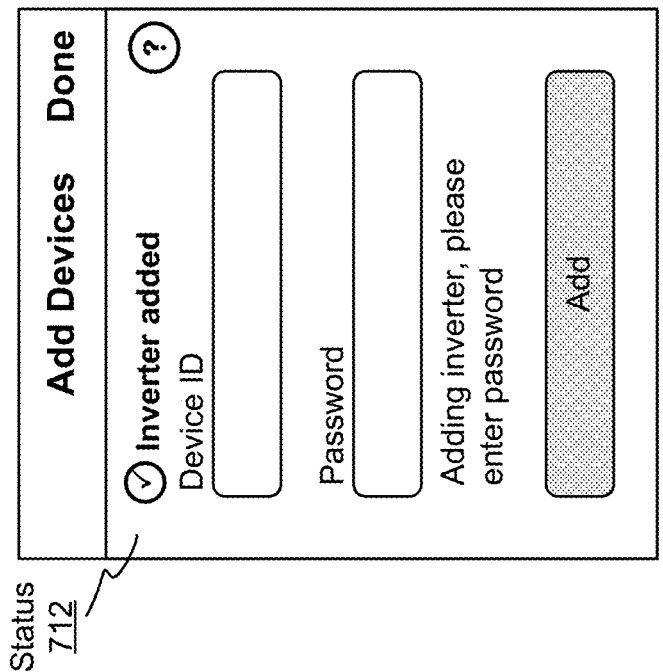
FIG. 7B shows an example of a graphical user interface for receiving text input including a password for a commissioning process according to an embodiment.

FIG. 7B shows an example of a graphical user interface for receiving text input including a password for a commissioning process according to an embodiment. Each of the components are like their counterparts in FIG. 7A unless otherwise described. A status area 712 corresponds to message area 706, which displays feedback to the user. In this example, an inverter was successfully added and this information is displayed to the user. The expected text input may change depending on the type of device to be added to a whitelist. For example, a password may be expected for an inverter but not a power optimizer. Here, a password section is displayed and the installer can enter the requested information to add an inverter to the whitelist. This example shows a state of the user interface after an inverter has been successfully added.

FIG. 7C shows another example of a graphical user interface for receiving text input for a commissioning process according to an embodiment. Each of the components are like their counterparts in FIGS. 7A and 7B unless otherwise described. In this example, the type of device being added (and that has been added) is a power optimizer (called "PV optimizer" here). Unlike the inverter, the power optimizer does not require a password, so only a device ID input area is displayed. Also displayed is a whitelist section like the one shown in FIG. 6B. Compared with FIG. 6B, another PV optimizer has been added, so the number of PV optimizers on the whitelist here is "21," and the total number of devices increases to 26.

Figure 8A:
FIG. 8A shows an example of a graphical user interface for displaying whitelist information for a commissioning process according to an embodiment.

FIG. 8A shows an example of a graphical user interface for displaying device information for a commissioning process according to an embodiment. The device reconciliation information shown here can be determined using a process such as the one in FIG. 3. Each of the components are like their counterparts in FIG. 5 unless otherwise described. Unlike the status indicator in FIG. 5, here status indicator 804 is "error" because an error has been detected. In various embodiments, status indicator 804 is not presented and instead status information can be presented alongside each device type as further described herein. For simplicity, this example only shows the devices section and the whitelist. In various embodiments, this screen is displayed after the controller attempts to connect to each of the devices (e.g., 302). The symbol next to the device type indicates whether a connection was successful and a more detailed message is displayed below the device type. Here, a checkmark indicates a normal connection, a "–" indicates a missing device, and "!" indicates an error. Different colors may be used for the icons to draw attention to them. Here, different shading is used for some of the icons as an example. Some reasons why a device is missing are described with respect to FIG. 3. Further details can be viewed by selecting the device type.

Figure 8B:
FIG. 8B shows an example of a graphical user interface for displaying whitelist information and error information for a commissioning process according to an embodiment.

FIG. 8B shows an example of a graphical user interface for displaying device information for a commissioning process according to an embodiment. Each of the components are like their counterparts in FIG. 8A unless otherwise described. For example, this screen may be displayed after selecting "PV optimizers" in FIG. 8A. Details about the missing optimizer can be displayed as shown. In this example, only seven out of eight PV optimizers successfully connected with the controller. The installer may determine that the whitelist is incorrect and select "Edit Devices" to remove one of the PV optimizers from the whitelist.

In various embodiments, an error can be accompanied by or include additional information and recommendations. For example, suggestions of fixes for detected faults, warnings, errors, or the like may be output. As another example, a playbook or relevant guide for each system error or common issues can be displayed.

Figure 9:
FIG. 9 shows an example of a graphical user interface for displaying device information for a commissioning process according to an embodiment.

FIG. 9 shows an example of a graphical user interface for displaying device information for a commissioning process according to an embodiment. For example, this screen may be displayed after selecting a specific device. Device details such as the ID number, part number, serial number, and model are displayed. The device can be removed by selecting the "Remove Device" button.

Figure 10:
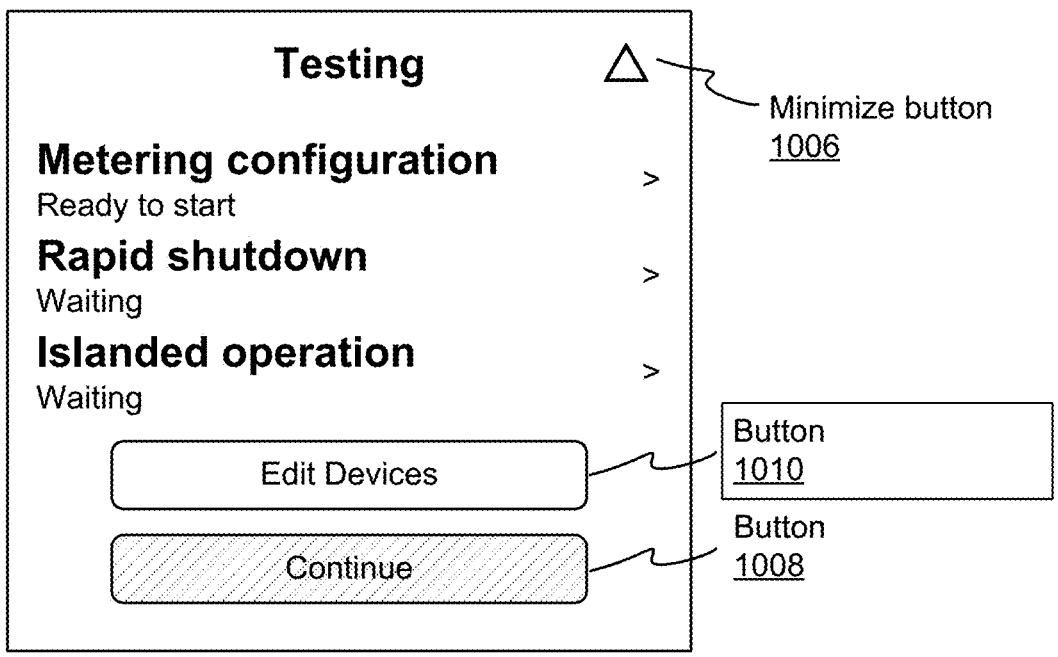
FIG. 10 shows an example of a graphical user interface for displaying testing status for a commissioning process according to an embodiment.

FIG. 10 shows an example of a graphical user interface for displaying testing status for a commissioning process according to an embodiment. This user interface corresponds to 404-408. For example, this screen may be displayed after selecting the maximize button 522 in FIG. 5. In various embodiments, the tests can be individually performed by selecting the link shown. Alternatively, one or more tests can be automatically performed. To collapse this section, the minimize button 1006 can be selected. In various embodiments, the button can appear or be enabled at a particular phase or set of phases. For example, the button is enabled for interaction at a testing phase. To continue to the next phase of the commissioning process (e.g., finalization), button 1008 can be selected.

In various embodiments, at least a subset of the tests is completed in order before being able to continue. For example, in a first state of the testing phase, the continue button 1008 is disabled and cannot be actioned. After the tests have been completed in order, the button becomes enabled and can be actioned. A user can return to a prior phase, by unlocking a prior phase (e.g. by tapping the "Edit Devices" button 1010) to re-enable a devices phase, and disable the testing phase. The ability to lock and unlock phases may help ensure that dependencies are met.

A variety of automated tests may be performed. In various embodiments, a test can be initiated and/or ended automatically and a user is notified via the GUI of an application (e.g., commissioning application 102). Test details and/or results may be output, stored, and/or included in a report such as a snapshot report further described herein. In various embodiments, a test is initiated and/or ended manually by a user via the application. Some examples are described, but this is merely exemplary and not intended to be limiting.

One type of automated test is a backup test. The backup test determines whether backup power will be sufficient for a microgrid in case of a power outage (e.g., the main grid is unavailable). As used herein, "microgrid" refers to a group of loads. For example, the microgrid is serviced at least in part by a solar power system 180. A microgrid is accessed and is operated while tracking aspects of the operation during the backup test.

In various embodiments, a backup test includes determining test pre-requisites, triggering a backup operation, holding backup mode for installer load tests, confirming tests are complete, and ending the backup operation.

In various embodiments, a test is disabled until pre-requisites are met. Some test pre-requisites may be automatically checked while other test pre-requisites may be displayed to the installer for review. Examples of pre-requisites include: all desired backup loads connected, system energized, and connected to the main grid. For example, if the ESS state of charge is too low, the user is warned before continuing. An example of an automatically checked pre-requisite is ESS state of charge. An example of a pre-requisite that is displayed to an installer for review is confirmation that all desired loads are connected.

In various embodiments, the backup operation is triggered when a microgrid is disconnected from the main grid (e.g., at a bridge). The disconnection may be automated by an application instructing the bridge to disconnect the microgrid from the main grid. Alternatively, an installer may manually disconnect the microgrid from the main grid. After disconnection, at least some of the larger loads of the microgrid may be operated (e.g., HVAC system, a washing machine, lights, charging for an electrical vehicle, etc.). When the backup mode is held for installer load tests, causes of failure include, by way of non-limiting example: the installer finds issues or incorrect loads backed-up or the inverter enters a fault state.

The test can be confirmed to be complete after the installer performed tests such as checking that the backup held for a predetermined time duration, turning mechanical loads on/off, etc. During the test, real time power values such as solar production, storage production/charging, grid, and household consumption can be displayed to the installer. The backup operation concludes when the installer ends the backup/islanded operation and reconnects to the main grid.

The peak amperage that was measured during the test is recorded. This may indicate the load that backup power should be able to accommodate in case of an outage. For example, at the conclusion of the test, a report may be generated indicating that the microgrid is confirmed to function and the solar power system (e.g., 180) is able to provide a measured amount of power to the microgrid.

The test results can be helpful for quality control. For example, a passing test indicates that customer expectations have been met. The test results indicate that at the time of installation (or some other time that the backup test is run), the recorded amount of power was tested. If troubleshooting is needed later for insufficient backup, the microgrid used during the test can be compared to a current microgrid to see if loads have been added or changed, thus leading to insufficient backup.

Results from the backup test can be helpful for determining specific user or per-distributor default settings such as backup reserves or recommended backup test durations.

Conventional backup tests require more installer involvement. For example, the installer turns off certain breakers to simulate that the main grid is unavailable. By contrast, the disclosed backup test can be integrated into a commissioning or configuration process with minimal installer input. Test results can be included in a snapshot report so an installer does not need to track the backup test separately.

Another type of automated test is a phase and polarity test of (field installed) accessory metering components. In various embodiments, test results can be used to automatically make corrections to the field installed accessory metering components. Field installed accessory metering components can be used to meter whole-home loads or non-backup loads. Metering non-backup loads (in addition to backup loads) allows on grid metering and whole home metering to be provided, and time-of-use load shifting can be performed. Loads are typically monitored by field wiring a component that measures current such as a Rogowski coil or an iron core current transformer.

As further described herein, the installation of field-installed metering components can be a major cause of installation errors. The installation errors can be reduced by performing the disclosed phase and polarity test and making corrections. For example, the phase and polarity of the Rogowski coils are detected, and adjustments are made in software so that the installer does not have to change anything physically about how they installed the device. In other words, the device can be installed (e.g., plugged in) in a variety of ways (e.g., with a lot of incorrectness) and the system will automatically make corrections.

Conventionally, field installed accessory metering components are simply flagged and require an installer to troubleshoot and determine how to fix the errors. By contrast, performing the disclosed phase and polarity test allows automatic corrections in software to be made.

In various embodiments, a phase and polarity test includes checking for component presence, inferring component phase assignment, and inferring component polarity. The phase and polarity test is initiated when it is determined that the installation involves a field installed accessory metering component. For example, an installer notes via a commissioning application (e.g., under an automated tests metering section such as the "metering configuration" of FIG. 10), that a partial home backup is applicable to the current installation situation. A partial home backup indicates that a field installed accessory metering component (e.g., Rogowski coils) was installed and so the phase and polarity test should be performed.

Figure 11:
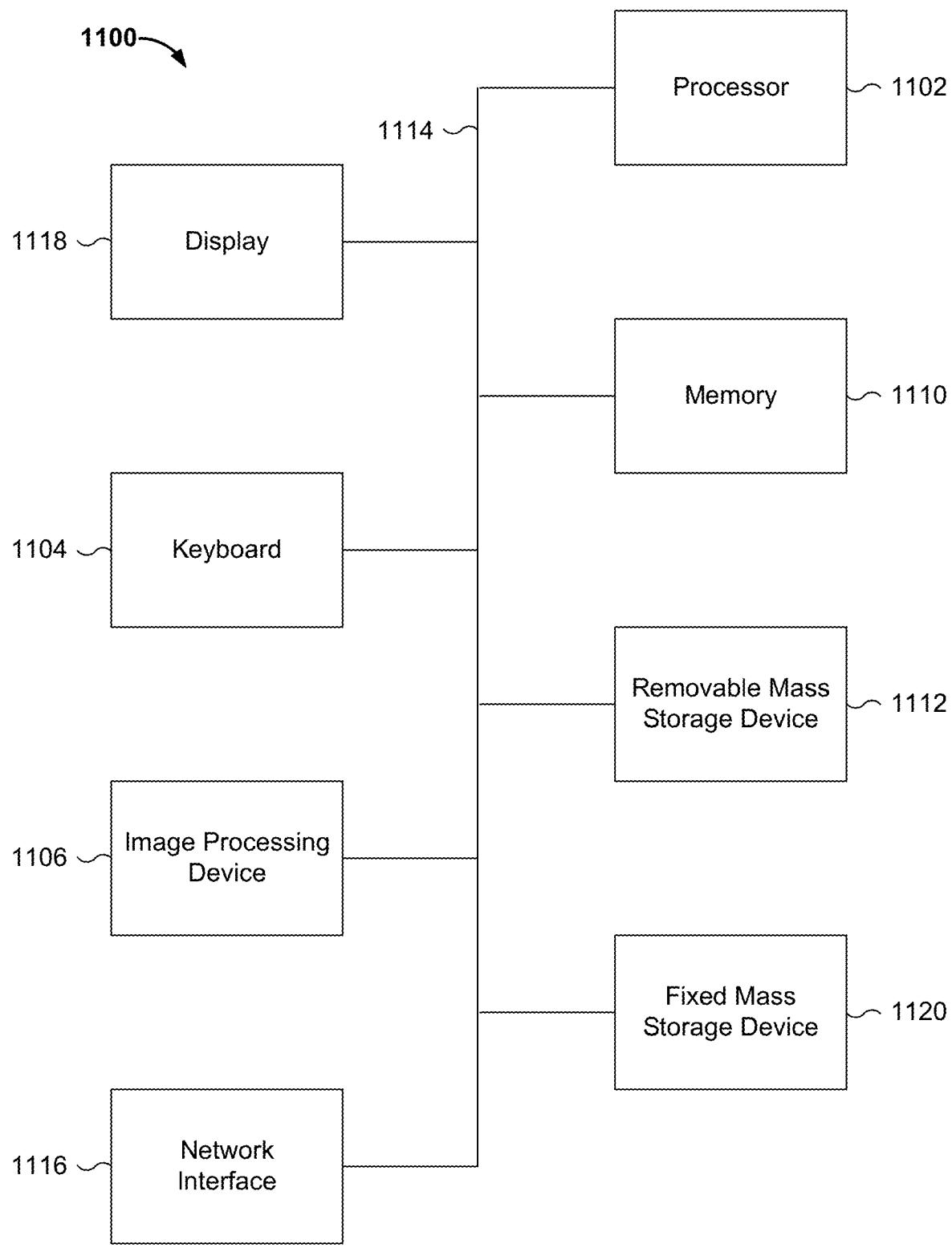
FIG. 11 is a functional diagram illustrating a programmed computer system for commissioning a solar power system in accordance with some embodiments.

FIG. 11 is a functional diagram illustrating a programmed computer system for commissioning a solar power system in accordance with some embodiments. As will be apparent, other computer system architectures and configurations can be used to perform the described commissioning technique. Computer system 1100, which includes various subsystems as described below, includes at least one microprocessor subsystem (also referred to as a processor or a central processing unit (CPU) 1102). For example, processor 1102 can be implemented by a single-chip processor or by multiple processors. In some embodiments, processor 1102 is a general purpose digital processor that controls the operation of the computer system 1100. In some embodiments, processor 1102 also includes one or more coprocessors or special purpose processors (e.g., a graphics processor, a network processor, etc.). Using instructions retrieved from memory 1110, processor 1102 controls the reception and manipulation of input data received on an input device (e.g., image processing device 1106, I/O device interface 1104), and the output and display of data on output devices (e.g., display 1118).

Processor 1102 is coupled bi-directionally with memory 1110, which can include, for example, one or more random access memories (RAM) and/or one or more read-only memories (ROM). As is well known in the art, memory 1110 can be used as a general storage area, a temporary (e.g., scratch pad) memory, and/or a cache memory. Memory 1110 can also be used to store input data and processed data, as well as to store programming instructions and data, in the form of data objects and text objects, in addition to other data and instructions for processes operating on processor 1102. Also as is well known in the art, memory 1110 typically includes basic operating instructions, program code, data, and objects used by the processor 1102 to perform its functions (e.g., programmed instructions). For example, memory 1110 can include any suitable computer readable storage media described below, depending on whether, for example, data access needs to be bi-directional or uni-directional. For example, processor 1102 can also directly and very rapidly retrieve and store frequently needed data in a cache memory included in memory 1110.

A removable mass storage device 1112 provides additional data storage capacity for the computer system 1100, and is optionally coupled either bi-directionally (read/write) or uni-directionally (read only) to processor 1102. A fixed mass storage 1120 can also, for example, provide additional data storage capacity. For example, storage devices 1112 and/or 1120 can include computer readable media such as magnetic tape, flash memory, PC-CARDS, portable mass storage devices such as hard drives (e.g., magnetic, optical, or solid state drives), holographic storage devices, and other storage devices. Mass storages 1112 and/or 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can be used to provide access to other subsystems and devices as well. As shown, these can include a display 1118, a network interface 1116, an input/output (I/O) device interface 1104, an image processing device 1106, as well as other subsystems and devices. For example, image processing device 1106 can include a camera, a scanner, etc.; I/O device interface 1104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1100. Multiple I/O device interfaces can be used in conjunction with computer system 1100. The I/O device interface can include general and customized interfaces that allow the processor 1102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1116 allows processor 1102 to be coupled to another computer, computer network, or telecommunications network using a network connection as shown. For example, through the network interface 1116, the processor 1102 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1104 and display 1118 share the touch sensitive screen component, which both detects user inputs and displays outputs to the user). In addition, bus 1114 is illustrative of any interconnection scheme serving to link the subsystems. Other computer architectures having different configurations of subsystems can also be utilized.

The number of hubs recommended for installation can be determined and provided to an installer. For example, guidance regarding expected wireless connectivity for various installation scenarios can be provided to installers to plan the installation and/or troubleshoot after installation. Factors that affect wireless connective may include one or more of the following: urban vs. rural area (noise floor), type of roofing, intervening structures such as ridges or dormers, line of sight, etc.

Multiple hubs can be spliced electrically to accommodate any geographic configuration and overcome corresponding wireless connectivity issues. As described herein, there may be many reasons why two groups of power optimizers are unable to communicate despite using a mesh network. For example, there may be interference due to a structure such as a metal roof. As another example, there may be physical limitations of a wireless communication system due to its limited range/capabilities. The following figures show some examples of solar power systems with one or more hubs.

FIG. 12A is a block diagram illustrating an embodiment of a system for commissioning a solar power system including a hub and a circuit. Each of the components in FIGS. 12A-13B are like their counterparts in FIG. 1 unless otherwise described. In this example there is a single hub (120), three strings, and a single circuit.

FIG. 12B is a block diagram illustrating an embodiment of a system for commissioning a solar power system including a hub and a plurality of circuits. This configuration allows two groups of power optimizers 1260 in different physical locations to communicate with a controller 114. This configuration may be desirable for a detached garage or trenching situation. For example, one subset of power optimizers (e.g., PV String 1) is provided on a detached garage, while another subset of power optimizers (PV String 2) is provided on a main house. PV Strings 1 and 2 are in communication with hub 120. In this example, hub 120 is sufficient for communications but if there is a degradation in communication quality, multiple hubs can be used as further described with respect to FIG. 13B.

FIG. 12C is a block diagram illustrating an embodiment of a system for commissioning a solar power system including a hub and a circuit. In this example there is a single hub (120), two strings, and a single circuit.

FIG. 12D is a block diagram illustrating an embodiment of a system for commissioning a solar power system including a hub and a circuit. In this example there is a single hub (120), a single string, and a single circuit.

FIG. 13A is a block diagram illustrating an embodiment of a system for commissioning a solar power system including a plurality of hubs. In this example there are two hubs (120a and 120b) and separate strings and circuits for each hub. This configuration allows two groups of power optimizers 1260 in different physical locations to communicate with a controller 114. This configuration may be desirable for a detached garage or trenching situation. For example, one subset of power optimizers (e.g., PV String 3) is provided on a detached garage, while another subset of power optimizers (PV Strings 1 and 2) is provided on a main house. PV Strings 1 and 2 are in communication with Hub 1, while PV String 3 is in communication with Hub 2. Each of the hubs have a respective circuit (Circuit 1 for Hub 1 and Circuit 2 for Hub 2) to the controller 114 as shown.

FIG. 13B is a block diagram illustrating an embodiment of a system for commissioning a solar power system including a plurality of hubs. In this example, a first subset of power optimizers 1260.1 and a second subset of power optimizers 1260.2 are in the same location, but the two groups are unable to communicate, so a second hub (Hub 2) is added.

A single controller is configured to communicate with multiple strings as follows. As described with respect to FIG. 1, the controller may be included in an inverter. In various embodiments, the inverter has multiple terminals to land different DC circuits. In other words, the inverter has a respective terminal for a respective circuit. For example, the inverter has two separate terminals for two separate circuits, and each circuit has its own bus. The inverter combines two DC buses together into a single bus, so the DC buses are combined before inverting the DC power to AC power.

In various embodiments, a location or order of optimizers can be determined using a voltage ladder. This can be helpful to help identify specific power optimizers that may be misbehaving (during the commissioning process or for other use cases), create a map of the system, among other things.

A voltage ladder refers to a group of devices connected in series. In a voltage ladder, each device will have a higher voltage than the previous device. Referring briefly to the power optimizers 1260 in FIG. 12A, PV String 1 is an example of a voltage ladder and the order of optimizers can be inferred so that each optimizer is aware of the voltage at that location. For example, suppose optimizer 1 and optimizer N are communicating with the controller. Optimizer 1 reports 60 volts and Optimizer N reports 180 volts. Based on this information, the controller could determine that the Optimizer expected to report 120 volts is not communicating.

The voltage ladder finds application in a variety of settings. For example, at the time of commissioning, the voltage ladder can be used to identify optimizers that are not communicating. Referring to the earlier example in which the optimizer expected to report 120 volts is missing, troubleshooting can be performed for that optimizer. For example, an error message can be output to an installer identifying the location of the optimizer that is missing or not communicating. This technique can be used in addition to or in replacement of the other techniques described to identify missing devices based on scanned QR codes (e.g., FIGS. 3 and 8A).

As another example, the voltage ladder can be used to service the system. Suppose a device in the system such as a PV panel or an optimizer is having an issue or a solar panel has an issue (e.g., faults). The specific device/location of the device to be replaced or serviced can be identified using the voltage ladder. This can be particularly helpful when the system has numerous devices.

As yet another example, the voltage can be used to create a layout or map of the system. For example, the system configuration can be determined and locations of various devices (e.g., on a roof, on a detached garage, etc.) can be useful for creating a layout that might be helpful for performance analysis, among other things.

In various embodiments, the commissioning process includes creating a snapshot (sometimes called a "report" or "system snapshot") with information collected during the commissioning process. The snapshot can include a photo and/or text such as system mounting information. For example, the snapshot is finalized at the end of commissioning and stored, output, or transmitted. Benefits of the snapshot include helping an installer confirm that the system is operational, meeting customer desires/compliance or other regulations, and providing a record of the commissioning procedure before the installer leaves the site.

The snapshot can be automatically populated with information obtained from a third party, telemetry, or other measurement data from the system, analytics, among other things. Information in the snapshot may include errors, the total time of commissioning, the total number of devices, site-specific details like address, identity of the installer, if any accessory components were installed, communication information such as whether the controller was connected to the customer's Wi-Fi network and/or details of the connection, whether the controller has cellular connectivity, etc. For example, troubleshooting/connection resolutions (e.g., FIG. 3), test results (e.g., FIG. 4), and other information collected during commissioning can be included in the snapshot.

Information such as the address of the installation site, job number, or identity of the installer can be obtained from the installer's platform. For example, an API call is made to the installer's server (e.g., Salesforce®) to pre-populate job site details in the commissioning application and/or snapshot report. Pre-populating this information improves data quality and/or user experience because the installer does not need to manually enter the information.

Errors identified during commissioning can be logged and included in the snapshot. This can be helpful to determine where installers struggle during the commissioning process and can be used to make improvements to the system to improve user experience and facilitate the commissioning process. Activity in the commissioning app can also be captured at various times via snapshots so that an Internet connection is not required to collect information/analytics. The collected information/analytics can be transmitted later when an Internet connection becomes available. The snapshot can be stored and/or output via a cloud, supporting the provision of remote troubleshooting of the system alongside the installer at the site.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a controller, hardware identifiers of a plurality of power electronics modules to be configured, wherein:
   each of the plurality of power electronics modules of at least a portion of the plurality of power electronics modules is associated with a corresponding photovoltaic panel;
   a hub is configured to wirelessly communicate with the plurality of power electronics modules; and the controller is physically connected to the hub and communicates with the hub via wiring that also carries power from photovoltaic panels to an inverter; and configuring, by the controller, the plurality of power electronics modules using the received hardware identifiers including by:

obtaining a whitelist of power electronics modules, wherein the whitelist includes the received hardware identifiers to the whitelist;

removing a device from the whitelist in response to a determination that the device failed to connect; and permitting communications with those power electronics modules of the plurality of power electronics modules that are on the whitelist.

2. The method of claim 1, wherein configuring the plurality of power electronics modules includes commissioning the plurality of power electronics modules.

3. The method of claim 1, wherein the hub is configured to wirelessly communicate with the plurality of power electronics modules via a mesh network.

4. The method of claim 1, wherein the hub is configured to communicate with the controller over power line communications (PLC).

5. The method of claim 1, wherein the plurality of power electronics modules and the hub are co-located.

6. The method of claim 1, wherein the controller is at least one of: included in the inverter and co-located with the inverter.

7. The method of claim 1, wherein the plurality of power electronics modules includes at least one power optimizer.

8. The method of claim 1, wherein the hub includes a power combiner box.

9. The method of claim 1, wherein the hardware identifiers are received based at least in part on scanning of barcodes corresponding to the plurality of power electronics modules.

10. The method of claim 1, wherein the hardware identifiers are received based at least in part on scanning of QR codes corresponding to the plurality of power electronics modules.

11. The method of claim 1, wherein the hardware identifiers include MAC addresses of the plurality of power electronics modules.

12. The method of claim 1, wherein configuring the plurality of power electronics modules using the received hardware identifiers includes:

determining that the device on the whitelist failed to connect; and in response to the determination that the device failed to connect, determining that the device does not belong on the whitelist.

13. The method of claim 1, wherein configuring the plurality of power electronics modules using the received hardware identifiers includes:

creating the whitelist of power electronics modules including by adding the received hardware identifiers to the whitelist;

determining, by the controller, that a device failed to connect;

in response to the determination that the device failed to connect, determining that the device does not belong on the whitelist; and in response to the determination that the device belongs on the whitelist, outputting information for resolving a connection issue with the device.

14. The method of claim 1, wherein configuring the plurality of power electronics modules using the received hardware identifiers includes:

creating the whitelist of power electronics modules including by adding the received hardware identifiers to the whitelist; and for each power electronics module on the whitelist:

establishing a communications channel with the power electronics module;

updating firmware of the power electronics module in response to a determination that the firmware of the power electronics module is not an approved version;

performing at least one safety test on the power electronics module; and improving safety of the power electronics module in response to a determination that the power electronics module failed the at least one safety test.

15. The method of claim 1, wherein configuring the plurality of power electronics modules using the received hardware identifiers includes:

updating firmware of at least one of the plurality of power electronics modules in response to a determination that the firmware of the at least one of the plurality of power electronics modules is not an approved version;

performing safety tests on the at least one of the plurality of power electronics modules; and improving safety of the at least one of the plurality of power electronics modules in response to a determination that the at least one of the plurality of power electronics modules failed a safety test.

16. The method of claim 1, wherein:

configuring the plurality of power electronics modules using the received hardware identifiers includes updating firmware of the plurality of power electronics modules at least in part by transmitting a firmware update command to the hub via communications over the wiring that delivers power from the photovoltaic panels; and the hub is configured to translate the firmware update command into a wireless communication to the plurality of power electronics modules.

17. The method of claim 1, wherein configuring the plurality of power electronics modules includes testing safety of the plurality of power electronics modules.

18. The method of claim 1, wherein configuring the plurality of power electronics modules using the received hardware identifiers includes displaying a graphical user interface for:

obtaining the hardware identifiers of the plurality of power electronics modules to be configured; and displaying a whitelist created using the obtained hardware identifiers.

19. The method of claim 18, wherein the graphical user interface is configured to display information for resolving a connection issue with a device on the whitelist.

20. The method of claim 1, further comprising performing a backup test by instructing a bridge to disconnect a microgrid from a main grid.

21. A system, comprising:

a hub configured to wirelessly communicate with a plurality of power electronics modules, wherein each of the plurality of power electronics modules of at least a portion of the plurality of power electronics modules is associated with a corresponding photovoltaic panel; and a controller configured to:
  receive hardware identifiers of the plurality of power electronics modules to be configured via the hub; and
  configure the plurality of power electronics modules using the received hardware identifiers including by:
    obtaining a whitelist of power electronics modules, wherein the whitelist includes the received hardware identifiers to the whitelist;
    removing a device from the whitelist in response to a determination that the device failed to connect; and
    permitting communications with those power electronics modules of the plurality of power electronics modules that are on the whitelist;
  wherein the controller is physically connected to the hub and communicates with the hub via wiring that also carries power from photovoltaic panels to an inverter.

22. A computer program product embodied in a non-transitory computer readable medium and comprising computer instructions for:
  receiving, at a controller, hardware identifiers of a plurality of power electronics modules to be configured, wherein:
    each of the plurality of power electronics modules of at least a portion of the plurality of power electronics modules is associated with a corresponding photovoltaic panel;
    a hub is configured to wirelessly communicate with the plurality of power electronics modules; and
    the controller is physically connected to the hub and communicates with the hub via wiring that also carries power from photovoltaic panels to an inverter; and
  configuring, by the controller, the plurality of power electronics modules using the received hardware identifiers including by:
  obtaining a whitelist of power electronics modules, wherein the whitelist includes the received hardware identifiers to the whitelist;
  removing a device from the whitelist in response to a determination that the device failed to connect; and
  permitting communications with those power electronics modules of the plurality of power electronics modules that are on the whitelist.

* * * * *